United States Patent
Pei et al.

(10) Patent No.: US 10,774,011 B2
(45) Date of Patent: Sep. 15, 2020

(54) LEAD-FREE HIGH-INSULATING CERAMIC COATING ZINC OXIDE ARRESTER VALVE AND PREPARATION METHOD THEREOF

(71) Applicant: TDK Electronics AG, München (DE)

(72) Inventors: Guangqiang Pei, Zhuhai (CN); Tao Gu, Zhuhai (CN); Zheng Yao, Shanghai (CN); Wen Shi, Shanghai (CN); Liyi Shi, Shanghai (CN)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/486,148

(22) PCT Filed: Feb. 13, 2018

(86) PCT No.: PCT/IB2018/050880
§ 371 (c)(1),
(2) Date: Aug. 14, 2019

(87) PCT Pub. No.: WO2018/150325
PCT Pub. Date: Aug. 23, 2018

(65) Prior Publication Data
US 2020/0223761 A1    Jul. 16, 2020

(30) Foreign Application Priority Data
Feb. 14, 2017   (CN) .......................... 2017 1 0078786

(51) Int. Cl.
*C04B 41/50* (2006.01)
*C04B 35/622* (2006.01)
(Continued)

(52) U.S. Cl.
CPC ........ *C04B 41/5049* (2013.01); *C04B 35/453* (2013.01); *C04B 35/6261* (2013.01);
(Continued)

(58) Field of Classification Search
CPC ............ C04B 41/5049; C04B 35/6261; C04B 41/4539; C04B 41/5155
See application file for complete search history.

(56) References Cited

U.S. PATENT DOCUMENTS

| | | | |
|---|---|---|---|
| 4,031,498 A | 6/1977 | Hayashi et al. | |
| 4,527,146 A * | 7/1985 | Kanai | H01C 7/112 252/519.52 |

(Continued)

FOREIGN PATENT DOCUMENTS

| | | |
|---|---|---|
| CN | 105924149 A | 9/2016 |
| CN | 106747406 A | 5/2017 |
| EP | 0241150 A2 | 10/1987 |

OTHER PUBLICATIONS

CN 105924149, Yao et al., machine translation. (Year: 2016).*

*Primary Examiner* — Kyung S Lee
(74) *Attorney, Agent, or Firm* — Slater Matsil, LLP

(57) ABSTRACT

A lead-free insulating ceramic coating zinc oxide arrester valve and a method for manufacturing thereof are disclosed. In an embodiment a method includes preparing an initial powder from starting materials with the following mass percentages: ZnO: 86-95%; Bi2O3: 1.0-3.0%; Co3O4: 0.5-1.5%; Mn3O4: 0.2-1.0%; Sb2O3: 3.0-9.0 %; NiO: 0.2-1.0%; and SiO2: 1.0-3.0%, preparing a ceramic coating powder by mixing the initial powder, deionized water and first grinding balls, milling the mixture, and drying and pulverizing the mixture, preparing a ceramic coating slurry by mixing a PVA solution, the ceramic coating powder and second grinding balls and milling the mixture, applying the ceramic coating slurry to a green body, heating and debinding the ceramic coating slurry with the green body thereby forming a resistor element and sintering the resistor element thereby obtaining a zinc oxide surge arrester valve block having a lead-free insulating ceramic coating.

20 Claims, 1 Drawing Sheet

(51) Int. Cl.
*C04B 35/626* (2006.01)
*C04B 35/634* (2006.01)
*C04B 35/64* (2006.01)
*C04B 35/638* (2006.01)
*C04B 41/00* (2006.01)
*C04B 41/45* (2006.01)
*C04B 41/87* (2006.01)
*C04B 41/51* (2006.01)
*C04B 41/52* (2006.01)
*C04B 41/90* (2006.01)
*C04B 41/88* (2006.01)
*H01C 7/12* (2006.01)
*H01C 17/00* (2006.01)
*C04B 35/453* (2006.01)

(52) U.S. Cl.
CPC .... *C04B 35/6264* (2013.01); *C04B 35/62222* (2013.01); *C04B 35/638* (2013.01); *C04B 35/63416* (2013.01); *C04B 35/64* (2013.01); *C04B 41/009* (2013.01); *C04B 41/4539* (2013.01); *C04B 41/4568* (2013.01); *C04B 41/5155* (2013.01); *C04B 41/522* (2013.01); *C04B 41/87* (2013.01); *C04B 41/88* (2013.01); *C04B 41/90* (2013.01); *H01C 7/12* (2013.01); *H01C 17/00* (2013.01); *C04B 2235/3263* (2013.01); *C04B 2235/3277* (2013.01); *C04B 2235/3279* (2013.01); *C04B 2235/3284* (2013.01); *C04B 2235/3294* (2013.01); *C04B 2235/3298* (2013.01); *C04B 2235/3418* (2013.01); *C04B 2235/72* (2013.01)

(56) References Cited

U.S. PATENT DOCUMENTS

| | | | | |
|---|---|---|---|---|
| 4,719,064 | A * | 1/1988 | Nakata | H01C 17/02 427/101 |
| 4,724,416 | A * | 2/1988 | Nakata | H01C 7/102 338/20 |
| 5,455,554 | A | 10/1995 | Sletson et al. | |
| 8,216,544 | B2 * | 7/2012 | Ando | H01B 1/08 423/622 |
| 9,672,964 | B2 * | 6/2017 | Greuter | H01C 7/112 |
| 2002/0121960 | A1 * | 9/2002 | Ando | H01C 7/13 338/21 |
| 2013/0011963 | A1 * | 1/2013 | Lien | C04B 35/453 438/104 |
| 2014/0361229 | A1 * | 12/2014 | Yamazaki | C04B 35/453 252/519.52 |
| 2017/0207009 | A1 * | 7/2017 | Miyata | C04B 35/453 |
| 2017/0278601 | A1 * | 9/2017 | Ishikawa | C04B 41/52 |

* cited by examiner

LEAD-FREE HIGH-INSULATING CERAMIC COATING ZINC OXIDE ARRESTER VALVE AND PREPARATION METHOD THEREOF

This patent application is a national phase filing under section 371 of PCT/IB2018/050880, filed Feb. 13, 2018, which claims the priority of Chinese patent application 201710078786.3, filed Feb. 14, 2017, each of which is incorporated herein by reference in its entirety.

TECHNICAL FIELD

The present invention relates to the technical field of electrotechnical ceramics, in particular to a zinc oxide surge arrester valve block having a lead-free highly insulating ceramic coating and a method for preparing same.

BACKGROUND

A zinc oxide surge arrester is an overvoltage protection apparatus. The properties of a zinc oxide surge arrester valve block, as a core component of the zinc oxide surge arrester, have a direct influence on the use of the surge arrester, and the effectiveness of a side insulating coating directly determines the capability of the surge arrester to withstand a large current surge. At present, side coating materials for the valve blocks of zinc oxide surge arresters include lead-containing side glazes, organic coatings represented chiefly by epoxy coatings and organosilicon coatings, and conventional inorganic coatings.

Since the main component of lead-containing side glaze is PbO, and PbO is a toxic substance which readily volatilizes when a green body is processed or sintered at high temperature, such a glaze will cause long-term irreversible harm to human society and the natural world, and is not in conformity with the environmentally friendly development trend of today's world.

With regard to organic coatings, since they do not bind well to resistor element green bodies, surfaces readily adsorb water or bubbles form thereon, with the result that such coatings have poor ability to withstand overvoltage. In addition, there is a large difference between the thermal expansion coefficient of an epoxy coating and that of a resistor element green body; when subjected to an impulse; epoxy resin might crack, resulting in arc-over of the side insulating coating. The temperature of use of organic coatings is not high, and this has limited the range of uses of this type of zinc oxide resistor element to a certain extent.

A conventional inorganic coating can only be applied once the resistor element green body has been pre-baked. This brings about the problem of secondary sintering; compared with other processes, there is an additional process step, and the result is that the process is complicated, the number of sintering operations is increased, and the sintering time is extended. There is impaired control over the stability of the various electrical properties of the resistor element, and a huge amount of electrical energy is wasted, which is not good for environmental protection, and also not good for the energy-saving and emission-reduction requirements of industrial production.

SUMMARY OF THE INVENTION

Embodiments provide a sintered zinc oxide surge arrester valve block having a lead-free highly insulating ceramic coating and a method for preparing the same. In an embodiment an inorganic material composition that has good compatibility with components of a green body is used, and after scientific proportioning and screening, a ceramic coating adapted to the expansion coefficient of the green body and having a high density is prepared, and used to cover a zinc oxide surge arrester valve block body by a series of processes, to form an inorganic protective layer with high insulating strength on the side of a resistor element. In various embodiments, the process is simplified, the process complexities of secondary sintering are avoided, and costs are reduced.

Embodiments provide:

A method for preparing a zinc oxide surge arrester valve block having a lead-free highly insulating ceramic coating, comprising the following steps:

step 1: preparing an initial powder from starting materials in the following mass percentages: ZnO: 86-95%; $Bi_2O_3$: 1.0-3.0%; $Co_3O_4$: 0.5-1.5%; $Mn_3O_4$: 0.2-1.0%; $Sb_2O_3$: 3.0-9.0%; NiO: 0.2-1.0%; $SiO_2$: 1.0-3.0%;

step 2: preparing a ceramic coating powder, wherein the ratio of the total mass of the initial powder to the mass of deionized water to the mass of agate grinding balls is 3:2:4, loading into a polyurethane ball mill jar and ball milling are carried out, and a slurry resulting from ball milling is oven-dried and pulverized, to obtain a ceramic coating powder;

step 3: a PVA solution is first prepared, then the ceramic coating powder obtained in step 2 is taken, wherein the ratio of the ceramic coating powder to the PVA solution to the mass of agate grinding balls is 1:0.6:3, and loading into a polyurethane ball mill jar and ball milling are carried out, to obtain a ceramic coating slurry;

step 4: the ceramic coating slurry is evenly spread on a side of a ZnO varistor element formed by pressing; once the slurry is dry, it is put into a heating furnace with a green body and integral debinding is performed; a resistor element resulting from debinding is sintered, the sintered green body undergoes abrasive disk processing and heat treatment; an end face of the heat-treated resistor element undergoes aluminum electrode spraying, to obtain a once-sintered zinc oxide surge arrester valve block product having a lead-free highly insulating ceramic coating.

Preferably, in step 2, the duration of ball milling is 12-48 h and the rotation speed is 450 r/min.

Preferably, in step 3, ball milling is carried out for 12-48 h and the rotation speed is 400 r/min.

Preferably, in step 4, the ceramic coating slurry is evenly spread on the side of the ZnO varistor element formed by pressing, in the application mass range of 8-12 $mg/cm^2$.

Preferably, in step 4, the debinding temperature is 500° C.-650° C., maintained for 2-3 h.

Preferably, in step 4, the sintering process consists of sintering at a temperature of 98° C.-1018° C., maintained for 3-4 h.

Preferably, in step 4, the heat treatment temperature in the heat treatment process is 480° C.-515° C., maintained for 1-2 h.

Preferably, in step 2, an ammonium polyacrylate dispersant is added at the rate of 0.5%-1.0% of the total mass of the initial powder total, deionized water and agate grinding balls before ball milling is carried out, and ball milled together therewith.

Preferably, in step 3, an ammonium polyacrylate dispersant is added at the rate of 1%-2% of the total mass of the ceramic coating powder, PVA solution and agate grinding balls before ball milling is carried out, and ball milled together therewith.

Further embodiments provide a zinc oxide surge arrester valve block having a lead-free highly insulating ceramic coating, comprising a surge arrester valve block body, the surge arrester valve block body having a side covered by a lead-free highly insulating ceramic coating, and upper and lower faces covered by aluminum layers, wherein the highly insulating ceramic coating is made of ZnO: 86-95%, Bi2O3: 1.0-3.0%, Co3O4: 0.5-1.5%, Mn3O4: 0.2-1.0%, Sb2O3: 3.0-9.0%, NiO: 0.2-1.0%, SiO2: 1.0-3.0% (mass proportion ranges), PVA solution and agate grinding balls.

The mass percentage concentration of the PVA solution is 5-10%.

Embodiments provide the following beneficial effects:

The formula of the once-sintered zinc oxide surge arrester valve block product having a lead-free highly insulating ceramic coating contains no lead component, and no harmful substances will be generated during preparation thereof; the absence of lead is friendly to human society and the environment, is beneficial for environmental protection, and is in conformity with the trend of sustainable development in today's world.

Embodiments provide an inorganic material composition that is well matched to the components of a green body; the thermal expansion coefficients of the coating and the green body are similar, and the coating and the green body are bound together well after sintering; moreover, the temperature of use of an inorganic coating is higher than that of an organic coating, so the range of uses for application to such a resistor element is expanded.

In various embodiments, only one sintering operation is needed to form an inorganic protective layer with high insulating strength on a side of a resistor element, so the process is simplified, the process complexities of secondary sintering are avoided, and costs are reduced.

DETAILED DESCRIPTION OF ILLUSTRATIVE EMBODIMENTS

Figure 1:
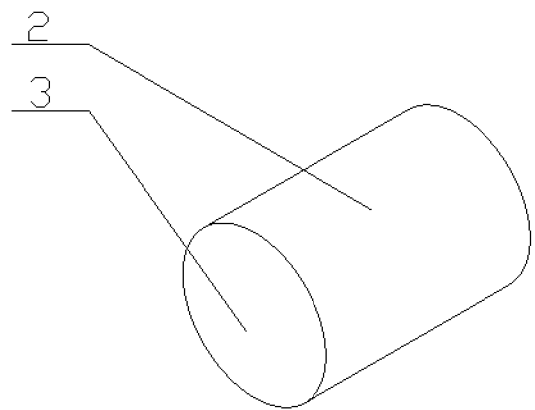
FIG. 1 is a structural schematic diagram of a particular embodiment of the present utility model.

The concept, specific structure and technical effects of the present invention are described clearly and fully below with reference to embodiments and the accompanying drawings, to enable full understanding of the object, features and effects of the present invention. Obviously, the embodiments described are merely some, not all, of the embodiments of the present invention. All other embodiments obtained by those skilled in the art on the basis of the embodiments of the present invention without expending inventive effort are included in the scope of protection of the present invention.

Example 1 of a method for preparing a zinc oxide surge arrester valve block having a lead-free highly insulating ceramic coating:

1. Starting materials are prepared in the following weight percentages: ZnO: 88.4%; Bi2O3: 2.5%; Co3O4: 0.6%; Mn3O4: 0.4%; Sb2O3: 7%; NiO: 0.3%; SiO2: 0.8%.

2. A ceramic coating powder is prepared in the abovementioned proportions; the ratio of the total mass of powder to the mass of deionized water to the mass of agate grinding balls is 3:2:4; an ammonium polyacrylate dispersant is added, being used at the rate of 0.5% of the total mass of powder; loading into a 10 L polyurethane ball mill jar is carried out; a jar-type ball mill is used to carry out ball milling for 48 h, with the rotation speed set at 450 r/min. A slurry resulting from ball milling is taken out, sieved and put into an oven to be dried, then pulverized using a pulverizer and sieved; a ZnO ceramic coating powder is thereby obtained.

3. A PVA solution with a mass percentage concentration of 10%, and an ammonium polyacrylate dispersant used at the rate of 1% of the total mass of powder, are taken, to obtain a mixed solution which is sieved. The abovementioned ceramic coating powder is taken; the total weight of powder is 0.5 kg, and the ratio of the total mass of powder to the mixed solution to the mass of agate grinding balls is 1:0.6:3; loading into a 5 L polyurethane ball mill jar is carried out; a jar-type ball mill is used to carry out ball milling for 16 h, with the rotation speed set at 400 r/min. A slurry resulting from ball milling is taken out, and sieved; the solid content of the slurry is about 70%.

4. The prepared ceramic coating slurry mentioned above is evenly spread by roller-coating on a side of a ZnO varistor element formed by pressing; the application mass is about 8 mg/cm2; once the slurry is dry, it is put into a heating furnace with a green body and integral debinding is performed; the temperature is kept at 405° C. for 3 h. The resistor element resulting from debinding is sintered at a temperature of 980° C., which is maintained for 4 h. The sintered green body undergoes abrasive disk processing. The resistor element resulting from grinding is put in a high-temperature electric furnace and undergoes heat treatment; the heat treatment temperature is 495° C., which is maintained for 2 h. End faces of the heat-treated resistor element undergo aluminum electrode spray processing, to obtain a once-sintered zinc oxide surge arrester valve block product having a lead-free highly insulating ceramic coating.

Example 2

1. Starting materials are prepared in the following weight percentages: ZnO: 89.2%; Bi2O3: 2.0%; Co3O4: 1.0%; Mn3O4: 0.8%; Sb2O3: 5.0%; NiO: 0.5%; SiO2: 1.5%.

2. A ceramic coating powder is prepared in the abovementioned proportions; the ratio of the total mass of powder to the mass of deionized water to the mass of agate grinding balls is 3:2:4; an ammonium polyacrylate dispersant is added, being used at the rate of 1.0% of the total mass of powder; loading into a 10 L polyurethane ball mill jar is carried out; a jar-type ball mill is used to carry out ball milling for 48 h, with the rotation speed set at 450 r/min. A slurry resulting from ball milling is taken out, sieved and put into an oven to be dried, then pulverized using a pulverizer and sieved; a ZnO ceramic coating powder is thereby obtained.

3. A PVA solution with a mass percentage concentration of 6.5%, and an ammonium polyacrylate dispersant used at the rate of 1% of the total mass of powder, are taken, to obtain a mixed solution which is sieved. The abovementioned ceramic coating powder is taken; the total weight of powder is 0.5 kg, and the ratio of the total mass of powder to the mixed solution to the mass of agate grinding balls is 1:0.6:3; loading into a 5 L polyurethane ball mill jar is carried out; a jar-type ball mill is used to carry out ball milling for 16 h, with the rotation speed set at 400 r/min. A slurry resulting from ball milling is taken out, and sieved; the solid content of the slurry is about 55%.

4. The prepared ceramic coating slurry mentioned above is evenly spread by roller-coating on a side of a ZnO varistor element formed by pressing; the application mass is about 9 mg/cm2; once the slurry is dry, it is put into a heating furnace with a green body and integral debinding is performed; the temperature is kept at 415° C. for 3 h. The resistor element resulting from debinding is sintered at a temperature of 1010° C., which is maintained for 4 h. The sintered green body undergoes abrasive disk processing. The resistor element resulting from grinding is put in a high-temperature electric furnace and undergoes heat treatment; the heat treatment temperature is 510° C., which is maintained for 2 h. End faces of the heat-treated resistor element undergo aluminum electrode spray processing, to obtain a once-sintered zinc oxide surge arrester valve block product having a lead-free highly insulating ceramic coating.

Example 3

1. Starting materials are prepared in the following weight percentages: ZnO: 86%; Bi2O3: 1.0%; Co3O4: 0.5%; Mn3O4: 0.2%; Sb2O3: 3%; NiO: 0.2%; SiO2: 1%.

2. A ceramic coating powder is prepared in the abovementioned proportions; the ratio of the total mass of powder to the mass of deionized water to the mass of agate grinding balls is 3:2:4; an ammonium polyacrylate dispersant is added, being used at the rate of 0.5% of the total mass of powder; loading into a 10 L polyurethane ball mill jar is carried out; a jar-type ball mill is used to carry out ball milling for 48 h, with the rotation speed set at 450 r/min. A slurry resulting from ball milling is taken out, sieved and put into an oven to be dried, then pulverized using a pulverizer and sieved; a ZnO ceramic coating powder is thereby obtained.

3. A PVA solution with a mass percentage concentration of 5%, and an ammonium polyacrylate dispersant used at the rate of 1% of the total mass of powder, are taken, to obtain a mixed solution which is sieved. The abovementioned ceramic coating powder is taken; the total weight of powder is 0.5 kg, and the ratio of the total mass of powder to the mixed solution to the mass of agate grinding balls is 1:0.6:3; loading into a 5 L polyurethane ball mill jar is carried out; a jar-type ball mill is used to carry out ball milling for 16 h, with the rotation speed set at 400 r/min. A slurry resulting from ball milling is taken out, and sieved; the solid content of the slurry is about 65%.

4. The prepared ceramic coating slurry mentioned above is evenly spread by roller-coating on a side of a ZnO varistor element formed by pressing; the application mass is about 8 mg/cm2; once the slurry is dry, it is put into a heating furnace with a green body and integral debinding is performed; the temperature is kept at 405° C. for 3 h. The resistor element resulting from debinding is sintered at a temperature of 980° C., which is maintained for 4 h. The sintered green body undergoes abrasive disk processing. The resistor element resulting from grinding is put in a high-temperature electric furnace and undergoes heat treatment; the heat treatment temperature is 495° C., which is maintained for 2 h. End faces of the heat-treated resistor element undergo aluminum electrode spray processing, to obtain a once-sintered zinc oxide surge arrester valve block product having a lead-free highly insulating ceramic coating.

Example 4

1. Starting materials are prepared in the following weight percentages: ZnO: 95%; Bi2O3: 3%; Co3O4: 1.5%; Mn3O4: 1.0%; Sb2O3: 9%; NiO: 1.0%; SiO2: 3.0%.

2. A ceramic coating powder is prepared in the abovementioned proportions; the ratio of the total mass of powder to the mass of deionized water to the mass of agate grinding balls is 3:2:4; an ammonium polyacrylate dispersant is added, being used at the rate of 1.0% of the total mass of powder; loading into a 10 L polyurethane ball mill jar is carried out; a jar-type ball mill is used to carry out ball milling for 48 h, with the rotation speed set at 450 r/min. A slurry resulting from ball milling is taken out, sieved and put into an oven to be dried, then pulverized using a pulverizer and sieved; a ZnO ceramic coating powder is thereby obtained.

3. A PVA solution with a mass percentage concentration of 6%, and an ammonium polyacrylate dispersant used at the rate of 1% of the total mass of powder, are taken, to obtain a mixed solution which is sieved. The abovementioned ceramic coating powder is taken; the total weight of powder is 0.5 kg, and the ratio of the total mass of powder to the mixed solution to the mass of agate grinding balls is 1:0.6:3; loading into a 5 L polyurethane ball mill jar is carried out; a jar-type ball mill is used to carry out ball milling for 16 h, with the rotation speed set at 400 r/min. A slurry resulting from ball milling is taken out, and sieved; the solid content of the slurry is about 80%.

4. The prepared ceramic coating slurry mentioned above is evenly spread by roller-coating on a side of a ZnO varistor element formed by pressing; the application mass is about 8 mg/cm2; once the slurry is dry, it is put into a heating furnace with a green body and integral debinding is performed; the temperature is kept at 405° C. for 3 h. The resistor element resulting from debinding is sintered at a temperature of 980° C., which is maintained for 4 h. The sintered green body undergoes abrasive disk processing. The resistor element resulting from grinding is put in a high-temperature electric furnace and undergoes heat treatment; the heat treatment temperature is 495° C., which is maintained for 2 h. End faces of the heat-treated resistor element undergo aluminum electrode spray processing, to obtain a once-sintered zinc oxide surge arrester valve block product having a lead-free highly insulating ceramic coating.

Test results for the four examples above are as follows: the surge arrester valve blocks can all safely pass when the energizing current is 500 A with a duration of 2 ms, and can also safely pass at 100 KA for 4/10 μs.

Figure 2:
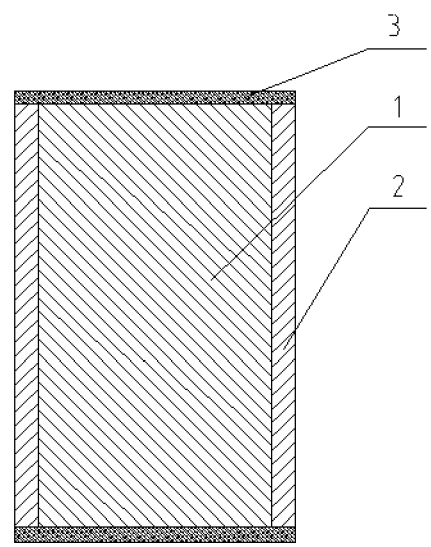
FIG. 2 is a sectional schematic diagram of a particular embodiment of the present utility model.

As shown in FIGS. 1 and 2, the zinc oxide surge arrester valve block having a lead-free highly insulating ceramic coating, made by the method described above, comprises a surge arrester valve block body 1; the surge arrester valve block body has a side covered by a lead-free highly insulating ceramic coating 2, and upper and lower faces covered by aluminum layers 3, wherein the highly insulating ceramic coating is made of ZnO: 86-95%, Bi2O3: 1.0-3.0%, Co3O4: 0.5-1.5%, Mn3O4: 0.2-1.0%, Sb2O3: 3.0-9.0%, NiO: 0.2-1.0%, SiO2: 1.0-3.0% (mass proportion ranges), PVA solution and agate grinding balls.

The mass percentage concentration of the PVA solution is 5-10%.

It must be explained that the embodiments above are merely preferred embodiments of the present invention. The present invention is not limited to these embodiments; any embodiment which achieves the technical effect of the present invention by the same means shall be included in the scope of protection of the present invention.

The invention claimed is:

1. A method for preparing a zinc oxide surge arrester valve block having a lead-free insulating ceramic coating, the method comprising:
preparing an initial powder from starting materials with the following mass percentages: ZnO: 86-95%; Bi2O3:

1.0-3.0%; Co3O4: 0.5-1.5%; Mn3O4: 0.2-1.0%; Sb2O3: 3.0-9.0%; NiO: 0.2-1.0%; and SiO2: 1.0-3.0%;

preparing a ceramic coating powder by mixing the initial powder, deionized water and first agate grinding balls, loading the mixture into a polyurethane ball mill jar, ball milling the mixture, and oven-drying and pulverizing a slurry resulting from the ball milling, wherein a ratio of a mass of the initial powder to a mass of the deionized water to a mass of the first agate grinding balls is 3:2:4;

preparing a ceramic coating slurry by mixing a PVA solution, the ceramic coating powder and second agate grinding balls, loading the mixture into a polyurethane ball mill jar and ball milling the mixture, wherein a ratio of a mass of the ceramic coating powder to a mass of the PVA solution to a mass of the second agate grinding balls is 1:0.6:3; and spreading evenly the ceramic coating slurry on a side of a ZnO varistor element formed by pressing, once the slurry is dry, it is put into a heating furnace with a green body and integral debinding is performed, a resistor element resulting from debinding is sintered, the sintered green body undergoes abrasive disk processing and heat treatment; an end face of the heat-treated resistor element undergoes aluminum electrode spraying, to obtain the zinc oxide surge arrester valve block having a lead-free insulating ceramic coating.

2. The method of claim 1, wherein ball milling takes place for 22 h-48 h at a rotation speed of 450 r/min when preparing the ceramic coating powder.

3. The method of claim 1, wherein ball milling takes place for 22 h-48 h at a rotation speed of 400 r/min when preparing the ceramic coating slurry.

4. The method of claim 1, wherein the ceramic coating slurry is evenly spread on the side of the ZnO varistor element in a mass range of 8-12 mg/cm2.

5. The method of claim 1, wherein debinding comprises debinding at a temperature of 500° C.-650° C. maintained for 2 h-3 h.

6. The method of claim 1, wherein sintering comprises sintering at a temperature of 98° C.-1080° C. maintained for 3 h-4 h.

7. The method of claim 1, wherein the heat treatment comprises a heat treatment temperature of 480° C.-515° C. maintained for 1 h-2 h.

8. The method of claim 1, further comprising adding a first ammonium polyacrylate dispersant at a rate of 0.5%-1.0% of the mass of the initial powder, the deionized water and the first agate grinding balls before ball milling is carried out, and ball milling the initial powder, the deionized water and the first agate grinding balls with the first ammonium polyacrylate dispersant.

9. The method of claim 1, further comprising adding a second ammonium polyacrylate dispersant at the rate of 1%-2% of the mass of the ceramic coating powder, the PVA solution and the second agate grinding balls before ball milling is carried out, and ball milling the ceramic coating powder the PVA solution and the second agate grinding balls with the second ammonium polyacrylate dispersant.

10. A zinc oxide surge arrester valve block comprising:
a surge arrester valve block body;
a lead-free insulating ceramic coating disposed on a side of the surge arrester valve block body;
a first metal layer disposed on an upper face of the surge arrester valve block body; and
a second metal layer disposed on a lower face of the surge arrester valve block body,
wherein the insulating ceramic coating comprises ZnO: 86-95%, Bi2O3: 1.0-3.0%, Co3O4: 0.5-1.5%, Mn3O4: 0.2-1.0%, Sb2O3: 3.0-9.0%, NiO: 0.2-1.0%, and SiO2: 1.0-3.0%.

11. A method comprising:
preparing an initial powder from starting materials with the following mass percentages: ZnO: 86-95%; Bi2O3: 1.0-3.0%; Co3O4: 0.5-1.5%; Mn3O4: 0.2-1.0%; Sb2O3: 3.0-9.0%; NiO: 0.2-1.0%; and SiO2: 1.0-3.0%;

preparing a ceramic coating powder by mixing the initial powder, deionized water and first grinding balls, milling the mixture, and drying and pulverizing the mixture, wherein a ratio of a mass of the initial powder to a mass of the deionized water to a mass of the first grinding balls is 3:2:4;

preparing a ceramic coating slurry by mixing a PVA solution, the ceramic coating powder and second grinding balls and milling the mixture, wherein a ratio of a mass of the ceramic coating powder to a mass of the PVA solution to a mass of the second grinding balls is 1:0.6:3;

applying the ceramic coating slurry to a green body;
heating and debinding the ceramic coating slurry with the green body thereby forming a resistor element; and
sintering the resistor element thereby obtaining a zinc oxide surge arrester valve block having a lead-free insulating ceramic coating.

12. The method of claim 11, wherein the ceramic coating slurry is evenly spread on a side of the green body.

13. The method of claim 12, wherein the ceramic coating slurry is evenly spread in a mass range of 8-12 mg/cm2.

14. The method of claim 11, wherein debinding comprises debinding at a temperature of 500° C.-650° C. maintained for 2 h-3 h.

15. The method of claim 14, wherein debinding is maintained for 12 h-3 h.

16. The method of claim 11, wherein sintering comprises sintering at a temperature of 98° C.-1080° C.

17. The method of claim 16, wherein sintering is maintained for 13 h-4 h.

18. The method of claim 11, further comprising adding a first ammonium polyacrylate dispersant at a rate of 0.5%-1.0% of the mass of the initial powder, the deionized water and the first grinding balls before ball milling is carried out, and ball milling the initial powder, the deionized water and the first grinding balls with the first ammonium polyacrylate dispersant.

19. The method of claim 11, further comprising adding a second ammonium polyacrylate dispersant at the rate of 1%-2% of the mass of the ceramic coating powder, the PVA solution and the second grinding balls before ball milling, and ball milling the ceramic coating powder the PVA solution and the second grinding balls with the second ammonium polyacrylate dispersant.

20. The method of claim 11, wherein the first and second grinding balls are agate grinding balls.

* * * * *

UNITED STATES PATENT AND TRADEMARK OFFICE
CERTIFICATE OF CORRECTION

PATENT NO. : 10,774,011 B2  
APPLICATION NO. : 16/486148  
DATED : September 15, 2020  
INVENTOR(S) : Pei et al.

Page 1 of 1

It is certified that error appears in the above-identified patent and that said Letters Patent is hereby corrected as shown below:

In the Claims

In Column 7, Line 41, Claim 6, delete "98°" and insert --980°--.

In Column 8, Line 43, Claim 16, delete "98°" and insert --980°--.

Signed and Sealed this  
Twenty-seventh Day of October, 2020

Andrei Iancu  
*Director of the United States Patent and Trademark Office*